United States Patent
Hill et al.

(10) Patent No.: US 10,891,425 B2
(45) Date of Patent: Jan. 12, 2021

(54) SYSTEMS AND METHODS FOR PRESENTATION OF A TERMINAL APPLICATION SCREEN

(71) Applicant: Ivanti, Inc., South Jordan, UT (US)

(72) Inventors: James George Hill, South Jordan, UT (US); Jared Vincent Jonas, South Jordan, UT (US); Davidson James Banner, South Jordan, UT (US)

(73) Assignee: Ivanti, Inc., South Jordan, UT (US)

( * ) Notice: Subject to any disclaimer, the term of this patent is extended or adjusted under 35 U.S.C. 154(b) by 461 days.

(21) Appl. No.: 15/222,739

(22) Filed: Jul. 28, 2016

(65) Prior Publication Data

US 2018/0032490 A1    Feb. 1, 2018

(51) Int. Cl.
*G06F 40/151* (2020.01)
*G06F 40/14* (2020.01)
*G06F 40/186* (2020.01)

(52) U.S. Cl.
CPC ............ *G06F 40/151* (2020.01); *G06F 40/14* (2020.01); *G06F 40/186* (2020.01)

(58) Field of Classification Search
CPC ............... G06F 17/2264; G06F 17/227; G06F 17/2247; G06F 40/151; G06F 40/186; G06F 40/14
See application file for complete search history.

(56) References Cited

U.S. PATENT DOCUMENTS

| | | | |
|---|---|---|---|
| 5,283,888 A | 2/1994 | Dao et al. | |
| 5,754,830 A | 5/1998 | Butts et al. | |
| 5,855,000 A | 12/1998 | Waibel et al. | |
| 5,968,119 A | 10/1999 | Stedman et al. | |
| 5,974,135 A | 10/1999 | Breneman et al. | |
| 6,023,714 A | 2/2000 | Hill et al. | |
| 6,049,602 A | 4/2000 | Foladare et al. | |
| 6,226,361 B1 | 5/2001 | Koyama | |
| 6,269,336 B1 | 7/2001 | Ladd et al. | |
| 6,336,135 B1 | 1/2002 | Niblett et al. | |

(Continued)

FOREIGN PATENT DOCUMENTS

| | | |
|---|---|---|
| CA | 2380263 | 10/2003 |
| CA | 2696551 | 2/2009 |

(Continued)

OTHER PUBLICATIONS

LANDESK Software, Inc., "Wavelink VelocityCE User Guide," Mar. 24, 2015.

(Continued)

*Primary Examiner* — Thu V Huynh

(57) ABSTRACT

A method for automatic presentation of a terminal application screen is described. The method includes receiving terminal application screen data from a server. The method also includes selecting a transformation template based on a comparison of text in the terminal application screen data to identification text in the transformation template. The transformation template includes instructions for transforming the terminal application screen data into an HTML page. The method further includes transforming the terminal application screen data into the HTML page using the selected transformation template. The HTML page is displayed in a web interface on a client device.

20 Claims, 8 Drawing Sheets

(56) References Cited

U.S. PATENT DOCUMENTS

| | | | |
|---|---|---|---|
| 6,466,654 B1 | 10/2002 | Cooper et al. | |
| 6,587,820 B2 | 7/2003 | Kosaka et al. | |
| 6,662,163 B1 | 12/2003 | Albayrak et al. | |
| 6,687,339 B2 | 2/2004 | Martin | |
| 6,757,869 B1* | 6/2004 | Li | G06F 17/30893 |
| | | | 707/E17.117 |
| 6,772,413 B2 | 8/2004 | Kuznetsov | |
| 6,885,735 B2 | 4/2005 | Odinak et al. | |
| 6,976,227 B2 | 12/2005 | Kunz | |
| 7,027,568 B1 | 4/2006 | Simpson et al. | |
| 7,054,268 B1 | 5/2006 | Parantainen et al. | |
| 7,072,328 B2 | 7/2006 | Shen et al. | |
| 7,089,560 B1 | 8/2006 | Uhler et al. | |
| 7,093,129 B1 | 8/2006 | Gavagni et al. | |
| 7,200,555 B1 | 4/2007 | Ballard et al. | |
| 7,269,784 B1* | 9/2007 | Kasriel | G06F 17/30902 |
| | | | 707/E17.12 |
| 7,292,689 B2 | 11/2007 | Odinak et al. | |
| 7,398,209 B2 | 7/2008 | Kennewick et al. | |
| 7,496,516 B2 | 2/2009 | Tessel et al. | |
| 7,606,718 B2 | 10/2009 | Cloran | |
| 7,634,263 B2 | 12/2009 | Lough et al. | |
| 7,885,814 B2 | 2/2011 | Ikegami | |
| 7,912,726 B2 | 3/2011 | Alshawi et al. | |
| 8,117,268 B2 | 2/2012 | Jablokov et al. | |
| 8,229,753 B2 | 7/2012 | Galanes et al. | |
| 8,515,760 B2 | 8/2013 | Ikegami | |
| 8,635,069 B2 | 1/2014 | Van Wagenen et al. | |
| 8,826,115 B2 | 9/2014 | Raje | |
| 8,930,177 B2 | 1/2015 | Van Wagenen et al. | |
| 8,930,193 B2 | 1/2015 | Van Wagenen et al. | |
| 9,207,666 B2* | 12/2015 | Nixon | G05B 19/4183 |
| 9,648,083 B2 | 5/2017 | Van Wagenen et al. | |
| 10,033,797 B1 | 7/2018 | Alger | |
| 10,148,734 B2 | 12/2018 | Van Wagenen et al. | |
| 2001/0021246 A1 | 9/2001 | Okajima et al. | |
| 2002/0002463 A1 | 1/2002 | Kroeker et al. | |
| 2002/0062213 A1 | 5/2002 | Kosaka et al. | |
| 2002/0147746 A1* | 10/2002 | Lee | G06F 21/6218 |
| | | | 715/235 |
| 2002/0165719 A1 | 11/2002 | Wang et al. | |
| 2002/0169806 A1 | 11/2002 | Wang et al. | |
| 2002/0178182 A1 | 11/2002 | Wang et al. | |
| 2003/0007609 A1 | 1/2003 | Yuen et al. | |
| 2003/0009517 A1 | 1/2003 | Wang et al. | |
| 2003/0149745 A1 | 8/2003 | Dunay et al. | |
| 2003/0156130 A1 | 8/2003 | James et al. | |
| 2003/0158736 A1 | 8/2003 | James et al. | |
| 2003/0167334 A1* | 9/2003 | Butler | H04L 29/06 |
| | | | 709/227 |
| 2003/0187631 A1 | 10/2003 | Masushige et al. | |
| 2003/0193521 A1 | 10/2003 | Chen et al. | |
| 2003/0226115 A1 | 12/2003 | Wall et al. | |
| 2003/0234815 A1* | 12/2003 | Delaney | H04L 67/02 |
| | | | 715/762 |
| 2003/0236673 A1 | 12/2003 | Nakagawa et al. | |
| 2004/0005040 A1 | 1/2004 | Owens et al. | |
| 2004/0006474 A1 | 1/2004 | Gong et al. | |
| 2004/0024842 A1 | 2/2004 | Witt | |
| 2004/0083089 A1 | 4/2004 | Wade | |
| 2004/0230637 A1 | 11/2004 | Lecoueche et al. | |
| 2004/0267527 A1 | 12/2004 | Creamer et al. | |
| 2005/0021886 A1 | 1/2005 | Adema et al. | |
| 2005/0055700 A1 | 3/2005 | Singler et al. | |
| 2005/0071165 A1 | 3/2005 | Hofstader et al. | |
| 2005/0137868 A1 | 6/2005 | Epstein et al. | |
| 2005/0154775 A1 | 7/2005 | McGinn et al. | |
| 2006/0041685 A1 | 2/2006 | Bracewell et al. | |
| 2006/0069561 A1 | 3/2006 | Beattie et al. | |
| 2006/0178886 A1 | 8/2006 | Braho et al. | |
| 2007/0047719 A1 | 3/2007 | Dhawan et al. | |
| 2007/0150278 A1 | 6/2007 | Bates et al. | |
| 2007/0177717 A1 | 8/2007 | Owens et al. | |
| 2007/0192671 A1* | 8/2007 | Rufener | G06F 17/248 |
| | | | 715/205 |
| 2008/0010655 A1 | 1/2008 | Ellis et al. | |
| 2008/0065386 A1 | 3/2008 | Cross et al. | |
| 2008/0162143 A1 | 7/2008 | Agapi et al. | |
| 2008/0294721 A1 | 11/2008 | Berndt et al. | |
| 2009/0019313 A1 | 1/2009 | Pokala et al. | |
| 2009/0048831 A1 | 2/2009 | Van Wagenen et al. | |
| 2011/0006114 A1 | 1/2011 | Schueller et al. | |
| 2011/0099294 A1* | 4/2011 | Kapur | H04L 67/02 |
| | | | 709/246 |
| 2011/0153729 A1* | 6/2011 | Kawai | G06F 3/122 |
| | | | 709/203 |
| 2013/0321456 A1* | 12/2013 | Hultquist | G01C 21/3667 |
| | | | 345/629 |
| 2014/0013300 A1 | 1/2014 | Shavlik et al. | |
| 2014/0164910 A1* | 6/2014 | Leue | G06F 17/227 |
| | | | 715/236 |
| 2015/0256900 A1* | 9/2015 | Reese | H04N 21/812 |
| | | | 725/13 |
| 2015/0296027 A1* | 10/2015 | Bak | H04L 67/148 |
| | | | 709/202 |
| 2018/0048699 A1 | 2/2018 | Van Wagenen et al. | |

FOREIGN PATENT DOCUMENTS

| | | |
|---|---|---|
| EP | 0529915 | 3/1993 |
| EP | 2188970 | 5/2010 |
| JP | H05-257849 | 10/1993 |
| JP | H09-293119 | 11/1997 |
| JP | 2000-285063 | 10/2000 |
| JP | 2000-514257 | 10/2000 |
| JP | 2001-296991 | 10/2001 |
| JP | 2002-023996 | 1/2002 |
| JP | 2002-099405 | 4/2002 |
| JP | 2002-244838 | 8/2002 |
| JP | 2002-288127 | 10/2002 |
| JP | 2003-044093 | 2/2003 |
| JP | 2003-140681 | 5/2003 |
| JP | 2003-216309 | 7/2003 |
| JP | 2003-522476 | 7/2003 |
| JP | 2004-029457 | 1/2004 |
| JP | 2004-104762 | 4/2004 |
| JP | 2004-133699 | 4/2004 |
| JP | 2004-287201 | 10/2004 |
| JP | 2005-108087 | 4/2005 |
| JP | 2006-054517 | 2/2006 |
| JP | 2006-127499 | 5/2006 |
| JP | 2006-301223 | 11/2006 |
| JP | 2007-509377 | 4/2007 |
| JP | 2007-114582 | 5/2007 |
| WO | WO 1997/049251 | 12/1997 |
| WO | WO 00/04709 | 1/2000 |
| WO | WO 2001/057651 | 8/2001 |
| WO | WO 2001/058095 | 8/2001 |
| WO | WO 2003/071385 | 8/2003 |
| WO | WO 2005/038777 | 4/2005 |
| WO | WO 2009/023261 | 2/2009 |

OTHER PUBLICATIONS

Wavelink Corporation, "Wavelink Studio 5.0 User's Guide," Aug. 8, 2006.

LANDESK Software, Inc., "Wavelink's TE Client for iOS User Guide," Jul. 27, 2016.

LANDESK Software, Inc., "Wavelink's TE Client for Android User Guide," Jul. 27, 2016.

StayLinked, Wireless Terminal Emulation Session Management and Screen Recognition Device Management and Usage Tracking, StayLinked Administrator User Guide, Rev. 12.1.0, Nov. 3, 2014, 103 pages.

Stay-Linked Corporation, 5250/3270, VT100/220, SSHv2, Thin-Client Terminal Emulation, Advanced Terminal Session Management, 2007, 1 page.

Stay-Linked, Secure Communications Guide, Wireless Terminal Emulation, Advanced Terminal Session Management (ATSM), Device Management, Rev. 10.0.0, Apr. 26, 2010, 13 pages.

(56) References Cited

OTHER PUBLICATIONS

StayLinked Screen Recognition, Reformatting and SmartTE, v14.3, Jul. 13, 2017, 54 pages.
Office Action for U.S. Appl. No. 11/893,676, dated Jul. 19, 2012, 8 pages.
Office Action for U.S. Appl. No. 11/893,676, dated Jan. 6, 2011, 10 pages.
Office Action for U.S. Appl. No. 11/893,676, dated Oct. 25, 2012, 9 pages.
Office Action for U.S. Appl. No. 11/893,676, dated Jul. 12, 2011, 14 pages.
Patent Examination Report No. 1 for Australian Application No. 2008287331, dated Aug. 30, 2012, 3 pages.
Patent Examination Report No. 2 for Australian Application No. 2008287331, dated Dec. 21, 2012, 4 pages.
Patent Examination Report No. 3 for Australian Application No. 2008287331, dated Apr. 10, 2013, 3 pages.
Office Action for European Application No. 08795349.3, dated Nov. 11, 2015, 10 pages.
Office Action for Japanese Application No. 2010-521042, dated Jul. 2, 2013, 5 pages (with translation of pertinent portion).
Office Action for Japanese Application No. 2010-521042, dated Mar. 11, 2014, 6 pages (with translation of pertinent portion).
International Search Report and Written Opinion for International Patent Application No. PCT/US2008/009756, dated Dec. 1, 2008, 9 pages.
International Preliminary Report on Patentability for International Patent Application No. PCT/US2008/009756, dated Feb. 16, 2010, 7 pages.
Patent Examination Report No. 1 for Australian Application No. 2013206167, dated Feb. 6, 2015, 3 pages.
European Search Report for European Application No. 16186687.6, dated Dec. 23, 2016, 13 pages.
Office Action for European Application No. 16186687.6, dated Aug. 28, 2017, 6 pages.
Office Action for Japanese Application No. 2014-171043, dated Oct. 13, 2015, 8 pages (with translation of pertinent portion).
Office Action for Japanese Application No. 2014-171043, dated Jul. 26, 2016, 3 pages (with translation of pertinent portion).
Office Action for U.S. Appl. No. 13/467,461, dated Sep. 26, 2013, 10 pages.
Office Action for U.S. Appl. No. 13/467,461, dated Jul. 13, 2012, 7 pages.
Office Action for U.S. Appl. No. 13/467,461, dated Oct. 17, 2012, 9 pages.
Patent Examination Report No. 1 for Australian Application No. 2013206168, dated Feb. 6, 2015, 3 pages.
Office Action for Japanese Application No. 2016-075517, dated Mar. 28, 2017, 3 pages (Partial Translation).
Office Action for U.S. Appl. No. 13/467,673, dated Sep. 17, 2013, 10 pages.
Office Action for U.S. Appl. No. 13/467,673, dated Jul. 6, 2012, 8 pages.
Office Action for U.S. Application No. 13/467,673, dated Oct. 16, 2012, 10 pages.
Office Action for U.S. Appl. No. 14/190,959, dated Feb. 26, 2016, 9 pages.
Office Action for U.S. Appl. No. 14/190,959, dated Jun. 15, 2016, 7 pages.
Office Action for U.S. Appl. No. 14/464,369, dated Jul. 21, 2016, 21 pages.
Office Action for U.S. Appl. No. 14/464,369, dated Jan. 30, 2017, 19 pages.
International Search Report and Written Opinion for International Application No. PCT/US2017/044520, dated Oct. 5, 2017, 14 pages.
Tohru Asami, Internet RFC Dictionary: Request for Comments, 1st edition, ASCII, pp. 126-127, Nov. 1, 1998.
Ivanti, Press Release, "One Solution, One Vendor: Wavelink Avalanche Enables Mobile Task Workers Regardless of Device Type or Operating System," Mar. 26, 2014, 2 pages.
Stevens, W. R., Chap. 26, "Telnet and Rlogin: Remote Login," TCP/IP Illustrated, vol. 1: The Protocols, 1994, pp. 389-418.
Wavelink Corporation, "Wavelink TelnetCE Client User's Guide," wltn-wince-20050805-03 [online], Revised Aug. 5, 2005, 258 pages.
Wavelink Corporation, "Wavelink TelnetCE Client Scripting Reference Guide," wltn-rg-script-20050729 [online], http://www.wavelink.com, Revised Jul. 29, 2005, 98 pages.
Wikipedia, "Speech Application Programming Interface," [online], Retrieved from the Internet: <URL: http://en.wikipedia.org/wiki/Speech_Application_Programming_Interface>, Retrieved on Jul. 20, 2006, 5 pages.
Rocket Software, Inc., "HostFront Server Developer's Guide Version 5.3," Apr. 2011, 325 pages.
Evans, A. et al., interchange2014, "The Future of Mobile Enterprise Applications," May 2014, 23 pages.
Hilliker, D., "Newest UTF-8 TeraTerm Pro 4.45—Accessible, Free Serial, SSH and Telnet Terminal Emulator," Blind Access Journal, Sep. 16, 2006.
Extended European Search Report for European Application No. 18208727.0, dated Jun. 11, 2019, 11 pages.
Office Action for Japanese Application No. 2017-228837, dated Sep. 11, 2018, 8 pages (with translation of pertinent portion).
Office Action for Japanese Application No. 2017-228837, dated Apr. 16, 2019 (with translation of pertinent portion), 15 pages.
Coughlan, S. et al., "The Application of Modern PDA Technology for Effective Handheld Solutions in the Retail Industry," IEEE, ICIT 2003—Maribor, Slovenia, pp. 411-415.
Rykowski, J., "Who should take care of the personalization?", 2006, in IFIP International Federation for Information Processing, vol. 226, Project E-Society: Building Bricks, eds. R. Suomi et al., Boston: Springer, pp. 176-188.
Porter, J. D. et al., "Architectures for Integrating Legacy Information Systems with Modern Bar Code Technology," Journal of Manufacturing Systems, 23(3):256-265. SME. (2004).

* cited by examiner

SYSTEMS AND METHODS FOR PRESENTATION OF A TERMINAL APPLICATION SCREEN

TECHNICAL FIELD

The present disclosure generally relates to computers and computer-related technology. More specifically, the present disclosure relates to systems and methods for presentation of a terminal application screen.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with networks is providing a user interface for a program running on a remote server. In a scenario, the server may host a terminal application that has a text-based screen interface. A terminal application screen may be communicated to a client device as terminal control code. A client device may interpret the terminal control code to reproduce the terminal application screens.

A text-based terminal application screen may be difficult for users that are accustomed to web interfaces. Additionally, a text-based terminal application screen may provide limited opportunities for customization. As can be observed from this discussion, systems and methods that provide for automatic presentation of a terminal application screen in a Hyper Text Markup Language (HTML) page may be beneficial.

DETAILED DESCRIPTION

Figure 1:
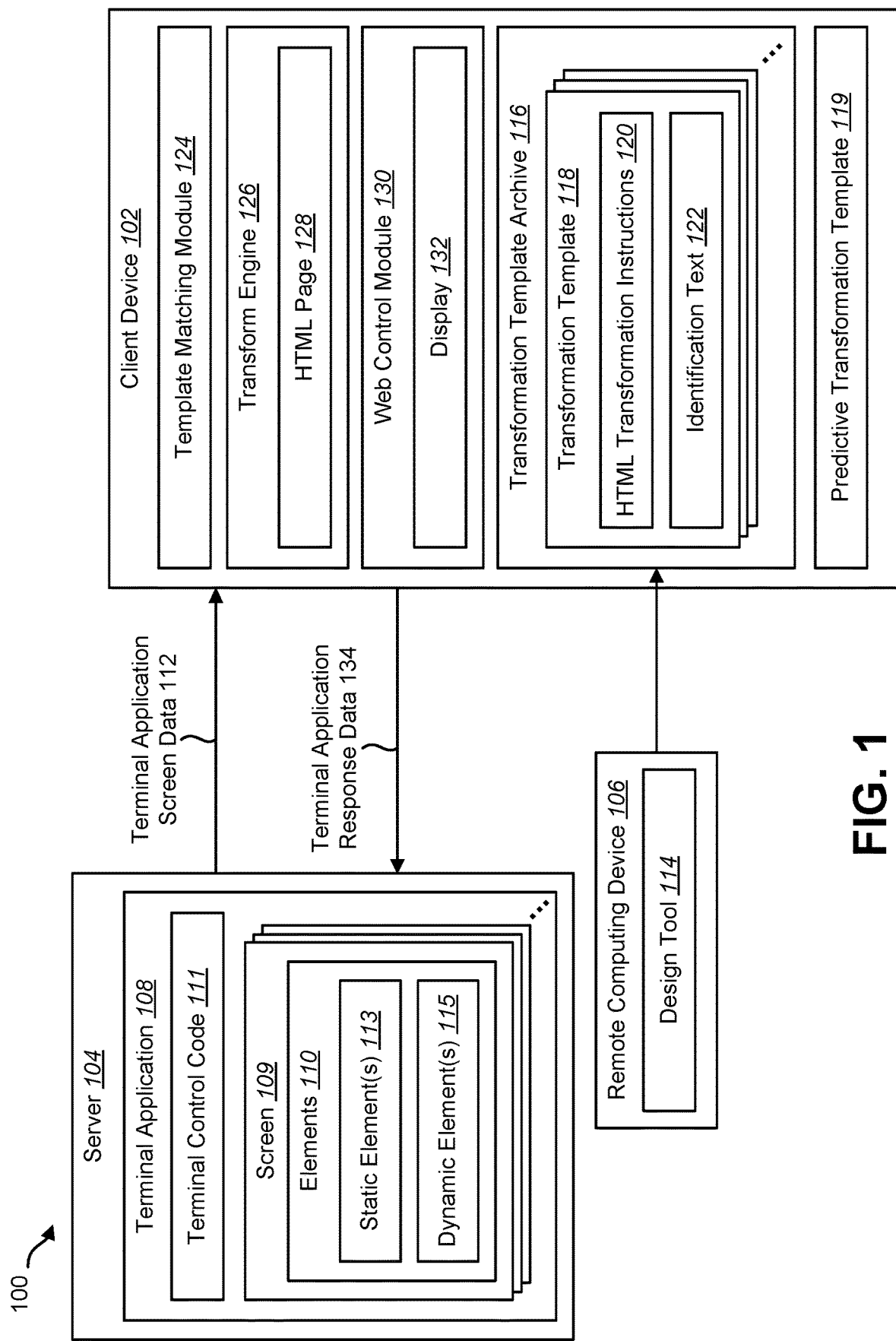
FIG. 1 is a block diagram illustrating one configuration of a network for presentation of terminal control code.

A method for automatic presentation of a terminal application screen is described. The method includes receiving terminal application screen data from a server. The method also includes selecting a transformation template based on a comparison of text in the terminal application screen data to identification text in the transformation template. The transformation template includes instructions for transforming the terminal application screen data into an HTML page. The method further includes transforming the terminal application screen data into the HTML page using the selected transformation template. The HTML page is displayed in a web interface on a client device.

Transforming the terminal application screen data into an HTML page may include superimposing dynamic elements from the terminal application screen data onto static elements from the selected transformation template to produce an HTML page.

The transformation template may be selected when text in the terminal application screen data matches identification text in the transformation template. The method may also include generating a predictive transformation template for transforming the terminal application screen data into an HTML page when the text in the terminal application screen data does not match the identification text in the transformation template.

The transformation template may bind user input to elements defined by the terminal application. The transformation template may be selected from among a plurality of different transformation templates that correspond to different terminal application screens.

The method may also include converting user input to the HTML page into a terminal application format based on the transformation template. The converted user input may be sent to the server.

A client device configured for automatic presentation of a terminal application screen is also described. The client device includes a processor, memory in electronic communication with the processor and instructions stored in the memory. The instructions are executable to receive terminal application screen data from a server. The instructions are also executable to select a transformation template based on a comparison of text in the terminal application screen data to identification text in the transformation template. The transformation template includes instructions for transforming the terminal application screen data into an HTML page. The instructions are further executable to transform the terminal application screen data into the HTML page using the selected transformation template, wherein the HTML page is displayed in a web interface on the client device.

A method for generating a transformation template is also described. The method includes generating an initial HTML rendering of a captured terminal application screen. The method also includes receiving one or more administrator customizations of the initial HTML rendering. The method further includes receiving identification text that uniquely identifies the captured terminal application screen. The method additionally includes combining the initial HTML rendering, the one or more administrator customizations and the identification text into a transformation template file.

The identification text may correspond to text in the captured terminal application screen. Generating the initial HTML rendering may include converting text from the captured terminal application screen into one or more HTML elements.

The transformation template may include instructions for transforming terminal application screen data into an HTML page. The method may also include sending the transformation template to a client device.

A computing device configured for generating a transformation template is also described. The computing device includes a processor, memory in electronic communication with the processor and instructions stored in the memory. The instructions are executable to generate an initial HTML rendering of a captured terminal application screen. The instructions are also executable to receive one or more administrator customizations of the initial HTML rendering. The instructions are further executable to receive identification text that uniquely identifies the captured terminal application screen. The instructions are additionally executable to combine the initial HTML rendering, the one or more administrator customizations and the identification text into a transformation template file.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram illustrating one configuration of a network 100 for presentation of terminal control code 111. The network 100 may include a plurality of electronic devices that are in electronic communication with one another.

The network 100 may include one or more Local Area Networks (LANs), Wide Area Networks (WANs), Wireless Local Area Networks (WLANs), the Internet, etc. The network 100 may include a one or more client devices 102 and at least one server 104.

The server 104 may communicate with the one or more client devices 102 via the network 100. The server 104 may be located in a remote location from a client device 102. In an implementation, the server 104 may be a cloud-based server. For example, the server 104 may be accessible via an Internet connection. The server 104 may also be located physically at the same location as one or more of the client devices 102. The server 104 may be referred to as a terminal server, back-end server, a host server or a host.

Examples of the client device 102 include a desktop computer, laptop computer, tablet computer, smartphone, router, printers, mobile inventory scanner, etc. In an implementation, the client device 102 may be a ruggedized mobile device configured for inventory management applications. The client device 102 may include a display, a scanner (e.g., optical, laser or infrared scanner) and one or more user input means (e.g., keyboard, touchscreen, touchpad, etc.).

The server 104 may perform a variety of management-related operations in conjunction with the client devices 102. Examples of these management-related operations include inventory management, sales management and/or order fulfilment.

The server 104 may host a terminal application 108. The terminal application 108 may be a computer program with which the server 104 executes one or more tasks. For example, the terminal application 108 may be an inventory management program that tracks the inventory of a warehouse or retail store. The terminal application 108 may include or interface with one or more databases.

In an implementation, the client device 102 may be a mobile device used for inventory management. For example, a sales associate in a retail store may walk around with the client device 102 taking inventory. The user may scan bar codes or enter data into the client device 102, which is then communicated to the server 104.

The terminal application 108 may be presented to a user via a user interface screen 109. In an implementation, the screen 109 may be entirely text-based. In other words, the terminal application 108 may present text to a user. In some circumstances, a user may be given an option to make a selection or enter text-based input. The screen 109 may have fixed-width characters in a matrix of rows and columns. The screen 109 interface may also be referred to as "green screen" terminal access.

A screen 109 may change based on user input or different states of the terminal application 108. For example, the terminal application 108 may have a first screen 109 that presents a menu with user-selectable options. The terminal application 108 may have additional screens 109 corresponding to different states of the terminal application 108. For example, upon a user selecting an option, the terminal application 108 may present a second screen 109 corresponding to the selected option.

The screen 109 of the terminal application 108 may include one or more elements 110. These elements 110 may include labels, user-selectable options and input fields. A label may be an element 110 that does not change. One or more elements 110 may be static elements 113 that remain unchanged for a given screen 109. Examples of static elements 113 include text descriptions of the screen 109. For example, a screen may include the word "Quantity," which does not change.

A screen 109 may also include one or more dynamic elements 115 that can change. Examples of dynamic elements 115 include feedback dialog text. For example, a dynamic element 115 may be a value (e.g., 2), which may or may not change. In this example, the label is a static element 113 and the value is a dynamic element 115.

The terminal application screens 109 may be displayed one at a time. Each of the different screens 109 may have a different set of elements 110. For example, a first screen 109 may include a first set of elements 110 and a second screen 109 may include a second set of elements 110.

A screen may be represented by terminal control code 111. With terminal emulation, a terminal application 108 does not send the screens 109. Instead, the terminal application 108 sends terminal control code 111, which are then interpreted into screens by the terminal emulation software at the client device 102. The elements 110 of a terminal screen 109 may be represented as a sequence of characters in the terminal control code 111.

The screen 109 of the terminal application 108 may be remotely displayed on the client device 102. The server 104 may send terminal application screen data 112 to the client device 102 over a network 100. The terminal application screen data 112 may include a stream of text with which the client device 102 may generate a screen 109. For example, the terminal application screen data 112 may include the terminal control code 111. This process may be referred to as terminal emulation. A user may remotely interact with the terminal application 108 using the client device 102. The client device 102 may communicate with the server 104 through a terminal protocol used by the terminal application 108.

The legacy text-based screen 109 of a terminal application 108 may present problems for end users of a client device 102. In an inventory management context, an organization may have significant investments in a terminal application 108. For example, some back-end terminal systems may be many years or decades old. A company may not want to replace their terminal systems due to the reliability of a terminal application 108 and/or the expense of replacing the terminal application 108 with a more modern web-based system. Furthermore, because a terminal application 108 may be mission critical to an organization, that organization may be apprehensive about switching the terminal application 108.

However, the legacy text-based screen 109 interface may not be convenient or intuitive for an end user of the client device 102. For example, a young sales associate may have never seen a green screen terminal computer before and a text-based screen 109 interface may be unfamiliar.

Another problem with the legacy text-based screen 109 approach is the lack of customization. For example, a system administrator may wish to customize the interface with the terminal application 108. This may include adding context dialog, logos, help features, etc. However, green screen terminal applications 108 have a limited ability to provide context clues, which can lead to disorientation in the terminal application 108 and potential errors. Furthermore, a system administrator may be hesitant to fundamentally change the terminal application 108 due to possible unforeseen errors.

Additionally, an organization may wish to take advantage of hardware advancements. For example, as hardware capabilities continue to improve, a company may want to use hardware in a client device 102 that can do more than present a green screen interface for a terminal application 108. These problems may be solved by a new web application that is hosted by a server. However, the creation and maintenance of a new web application is often cost-prohibitive.

Instead of creating a new web application, benefits may be realized by transforming the terminal application 108 screen 109 into Hyper Text Markup Language (HTML) for presentation in a web interface on the client device 102. In one approach, an additional server is used to produce a more user-oriented interface using a customized server-side interface to the terminal application 108. In another approach, an additional server digests web pages into a streaming image, suitable for display on under-powered devices with small screens. However, these approaches require programming to an application program interface (API) and require maintaining an additional server, which adds complexity and expense to a network 100.

These approaches deal with putting an additional server in the middle of the host server 104 and the client device 102. This additional server does some level of transform.

In yet another approach, some programmatic reformatting may be performed on certain basic screen elements 110 such as font size and background color. However, this approach fails to provide beneficial flexibility in customizing the presentation of the terminal application screen 109 on the client device 102.

The systems and methods described herein provide for presentation of a terminal application screen 109 as an HTML page 128. The client device 102 may recognize content of a screen 109 before it is presented to a user. The client device 102 then transforms the screen 109 into HTML, suitable for presentation in a web browser or web view. The client device 102 may use common HTML controls such as text boxes and buttons to replace text fields and input-driven menu items from the terminal application 108 screen 109. The systems and methods also provide a system administrator or user more control over the look and feel of the experience since HTML can be easily customized using style sheets.

The client device 102 may communicate with the back-end server 104 using a terminal protocol. The client device 102 then may transform on-the-fly that terminal presentation into a web presentation. When the end-user is interfacing with the terminal application 108, it appears to the user like they are interfacing with a web page, which is something that they may be very familiar with.

The round trip of data may include the following. The terminal application screen data 112 comes in to the client device 102. The client device 102 may transform the terminal application screen data 112 on-the-fly on the client device 102 to an HTML page 128 for web presentation. The user may interact with that web page and the client device 102 may send terminal application response data 134 back to the server 104 in the terminal protocol. This process may be repeated for changes in the current terminal application screen 109 or the next terminal application screen 109.

In an implementation, the systems and methods described herein may include at least three functional systems: a design tool 114, transformation template 118 matching and a transform engine 126. The design tool 114 may generate one or more transformation templates 118. The design tool 114 may be hosted on a remote computing device 106. For example, the remote computing device 106 may be a personal computer (PC) of a system administrator.

It should be noted that in another implementation, the design tool 114 may be included in the client device 102. However, in some circumstances, it may be advantageous to implement the design tool 114 on a remote computing device 106. For example, an organization may employ multiple client devices 102, in which case it may be desirable to deploy transformation templates 118 created by a single design tool 114 to all client devices 102. Additionally, a client device 102 may not have sufficient resources (e.g., hardware) to allow a user to generate a transformation template 118. For example, a handheld mobile inventory scanner may not provide a convenient interface for a user to generate a transformation template 118.

Using the design tool 114, a system administrator can capture screens 109 from a terminal session with the server 104. The screen 109 captures may come from a live session that was previously recorded. For example, the design tool 114 may record a terminal session with the terminal application 108, which may include one or more screens 109. The screens 109 may be communicated to the remote computing device 106 as American Standard Code for Information Interchange (ASCII) characters or other character data. The screens 109 may be displayed on the remote computing device 106 for the system administrator.

The design tool 114 may generate an initial HTML rendering of a captured terminal application screen 109. This initial HTML rendering may be a best guess of how the HTML might be rendered. The design tool 114 may include a set of rules for transforming the captured terminal application screen 109 into HTML code. The design tool 114 may recognize some combination or pattern of characters data in the screen 109 and may translate that into the HTML code. For example, if there is a line drawn in the terminal application 108 screen 109 using equal signs, the design tool 114 may draw a solid line in HTML instead.

It should be noted that the design tool 114 may observe an input type of screen 109. Terminal screens 109 are very rudimentary. There is only a finite number of screens 109 for a given terminal application 108. For example, there may be menu screens to go somewhere else, input screens to enter input and message type screens to tell a user that a task (e.g., inventory order) was completed. The design tool 114 may look for which type of screen 109 it is and then apply some base rules for that type of screen 109.

The design tool 114 may enable the system administrator to define how the web presentation will look when a previously captured screen 109 comes across the wire to a client device 102. For example, upon generating HTML code for the initial HTML rendering, the design tool 114 may display the initial HTML rendering for the system administrator. The design tool 114 allows the system administrator to define the HTML output page for the given screen 109. The system administrator may add to, modify or delete portions of the HTML code that is automatically generated by the design tool 114 in the initial HTML rendering. The system administrator may also define user input fields (including sizes, data types, symbology, etc.) for a given screen 109.

In an implementation, the design tool 114 may be a two-window program. The system administrator may see the terminal screen 109 on one side and then the formatted HTML output on the other screen. For example, the system administrator may go screen-by-screen looking at the terminal screen 109 on the left window. On the right window, the system administrator may follow up on the best guess initial HTML rendering and then correct how he or she wants the final HTML output to look.

The system administrator may identify static elements 113 and dynamic element 115 of a given screen 109. The transformation template 118 provides a framework to generate an HTML page 128. As described above, in the text terminal application screen 109, there may be static elements 113 that do not change. There may also be dynamic element 115 that can change within the same screen 109. For example, a dynamic element may be an inventory entry field. One person may order widget A and another may order widget B. So the screen 109 may be updated for the first order and the second order.

The transformation template 118 may account for static elements 113 and dynamic element 115 by blending the dynamic data into the static HTML code. In other words, the transformation template 118 may provide a set of rules within the transformation template 118 based on a known state of the terminal application screen 109. The system administrator may designate one or more areas as static elements 113 and one or more areas as dynamic element 115. Alternatively, the system administrator may designate only the dynamic element 115 and the rest of the screen 109 is considered static. Therefore, a single transformation template 118 may be used for different circumstances that can be accommodated by the dynamic element 115.

The system administrator may also specify identification text 122 that is used to uniquely identify the screen 109. The identification text 122 may correspond to text in the captured terminal application screen 109. The identification text 122 may act as a fingerprint for a given terminal application screen 109. The system administrator may designate a unique combination of text that is included in a given terminal application screen 109 as the identification text 122.

Each screen 109 may be treated as an individual screen 109. Therefore, a client device 102 should have a way to identify those different screens 109. The design tool 114 may automatically provide a suggestion as to what the identification text 122 could be. The system administrator can then modify the identification text 122.

The design tool 114 may combine the initial HTML rendering, the one or more administrator customizations and the identification text 122 into a transformation template 118. This may be a file that includes HTML transformation instructions 120 to transform a terminal application screen 109 into an HTML page 128. The transformation template 118 file may also include the identification text 122.

In an implementation, the HTML transformation instructions 120 may consist of a set of Extensible Markup Language (XML) rules. These XML rules may be used by a client device 102 to then generate the HTML page 128.

This process may be repeated for additional screens 109 in the terminal application 108. Thus, the design tool 114 may generate a plurality of different transformation templates 118 that correspond to different terminal application screens 109.

At least one transformation template 118 may be generated for a given terminal application 108. For example, there may be one transformation template 118 per screen 109. However, one transformation template 118 could also run two or three screens 109 if there are only small changes from the host.

The transformation template 118 may bind user input to elements 110 defined by the terminal application 108. In other words, the transformation template 118 may map when and how user input in an HTML page 128 transformation is provided back to the terminal application 108 in the form of terminal application response data 134. Therefore, elements in the HTML page 128 transformation of the terminal application screen 109 may be mapped back to the terminal protocol expected by the terminal application 108. This gives the system administrator more flexibility to customize how users interact with the terminal application 108.

The one or more transformation templates 118 may be sent to the client devices 102. For example, the transformation templates 118 may be copied to a client device 102 by the system administrator or deployed to a client device 102. In an implementation, software such as a mobile device management (MDM) application may be used to deploy the one or more transformation templates 118 to the client devices 102.

In the case of multiple transformation templates 118, the design tool 114 may send each transformation template 118 as a separate file. Alternatively, the design tool 114 may merge the transformation templates 118 into a single output file that is then sent to the one or more client devices 102. A client device 102 may store the one or more transformation templates 118 in a transformation template archive 116.

The client device 102 may include a template matching module 124. When the terminal application screen data 112 is received from the server 104, the template matching module 124 may attempt to match the identification text 122 from the one or more transformation templates 118 stored in the transformation template archive 116. In this way, the template matching module 124 may select the appropriate HTML page 128 to represent the terminal application screen 109. The template matching module 124 may receive the live stream terminal application screen data 112 from the terminal server 104. The template matching module 124 may then perform template matching.

The template matching module 124 may look at the identification text 122 in the one or more transformation templates 118. The template matching module 124 may then compare the identification text 122 to the terminal application screen data 112 from the server 104. The template matching module 124 may attempt to find a match between identification text 122 for a given transformation template 118 and a new screen 109 from the server 104. As soon as the template matching module 124 finds a match, it can proceed and provide that transformation template 118 to a transform engine 126.

Should no identification text 122 in a transformation template 118 match the text in the terminal application screen data 112, the client device 102 may generate a predictive transformation template 119 on-the-fly to provide a best guess of the HTML page 128. This process may be similar to the initial HTML rendering generated by the design tool 114. For example, the client device 102 may apply a set of rules for transforming the terminal application screen data 112 into HTML code. This predictive transformation template 119 may be provided to the transform engine 126.

Upon receiving the transformation template 118 (or predictive transformation template 119), the transform engine 126 may transform the terminal application screen data 112 into an HTML page 128 using the selected transformation template 118. The transform engine 126 may superimpose dynamic element 115 from the terminal application screen data 112 onto static elements 113 from the selected transformation template 118 to produce an HTML page 128. For example, the static elements 113 from the transformation template 118 may be marshaled and the dynamic element 115 from the terminal application screen data 112 may be superimposed to produce an HTML page 128 with which the user can interact.

The transform engine 126 may provide the HTML page 128 to a web control module 130. The web control module 130 may present the HTML page 128 in a display 132 on the client device 102. The display 132 may be a web interface such as a web browser or web view.

The web control module 130 may receive user input from one or more input devices. For example, the web control module 130 may receive input from a keyboard, a scanner (e.g., optical scanner, laser scanner or infrared scanner) or other input device.

The process works in reverse when user input is to be sent back to be processed by the server 104. Since the transformation template 118 binds user input to elements 110 defined by the terminal application 108, the client device 102 may also serve user input back to the server 104 in the form specified by the transformation template 118. There are some terminal screens 109 that need every character as it is pressed to come back over the wire. Then there are some terminal screens 109 where user input can be entered and sent all at once.

In an example, the end user may be looking at the HTML page 128 displayed on the client device 102. The user may take an action on that HTML page 128 that indicates that the user is taking one widget out of the warehouse. The user then clicks an "OK" button to process this transaction. Because the client device 102 is talking to the terminal server 104, the client device 102 takes that "1" and sends it back to the server 104 as if it had been sent in a terminal setting, as opposed to a web site. In the context of a quantity field, if the user types in "1," the client device 102 is going to send that "1" back in the terminal protocol, not as a web element.

In another example, if the user is on an HTML page 128 for a login, every character the user presses for the login may be sent back live to the terminal server 104 as the character is entered. That HTML page 128 is still operating as a web page but the client device 102 is sending each character back in the terminal protocol. When the terminal application response data 134 includes login data, the client device 102 may send literal login information. However, a menu selection could be driven by a button press on the display 132, which would cause the client device 102 to send a series of characters back to the terminal server 104 using the terminal protocol.

The system administrator may use the design tool 114 to customize how and when the client device 102 sends terminal application response data 134 back to the server 104. However, the terminal application response data 134 goes back in the terminal protocol as a terminal character. Therefore, the first half of this round-trip is the terminal going to web. The second half is web going back to terminal based on the appropriate way of how the terminal application 108 on the server 104 is expecting the output of the user's action on the web-formatted screen.

This approach gives a system administrator more flexibility to customize how users interact with the terminal application 108. Without the ability to customize the presentation of the terminal application screen 109 at the client device 102, end user interactions with the web formatted HTML page 128 would otherwise be bound to how the interaction was at the terminal screen 109. This would significantly limit the things that a user could do on the web-formatted HTML page 128. It should be noted that the terminal application screen 109 on the terminal server 104 is not being modified. Instead, the customization takes place using the transformation template 118 when the screen 109 comes across the wire to the client device 102.

Additionally, a client device-based approach to transforming the terminal application screen 109 is valuable to a company because the company can configure it and deploy configurations out to the client devices 102. The company does not have to maintain an expensive server or other hardware in their infrastructure. The systems and methods described herein do not require a server in the middle, which would add more complexity. The transform is happening on the client device 102. Additionally, the transformation templates 118 are highly customizable and highly deployable to multiple client devices 102.

The systems and methods described herein may also increase user productivity. For example, a web application is simpler than a green screen application, allowing a user to work faster. The described systems and methods require less training. Users are more familiar with a web interface than a green screen terminal application 108, allowing them to be productive sooner than users who need to spend time being trained on an unfamiliar system.

Another benefit of the described systems and methods includes speeding up menu selection and increasing accuracy. For example, a user can make a tactile selection rather than taking their eyes off the screen of the client device 102 to find the right key to press in a menu selection. Additionally, the described systems and methods allow context clues to be provided in web pages. The addition of common web controls helps users to quickly know what page they are interacting with. Green screen terminal applications 108 have a limited ability to provide context clues, which can lead to disorientation in the terminal application 108 and errors.

The described systems and methods improve upon current approaches due to the lack of a server-side requirement. Additionally, the design tool 114 does not require programming to an API on a server. Furthermore, since screen elements 110 are completely abstracted, a system administrator has much greater flexibility in customizing the presentation of the screen 109 as a web interface.

Figure 2:
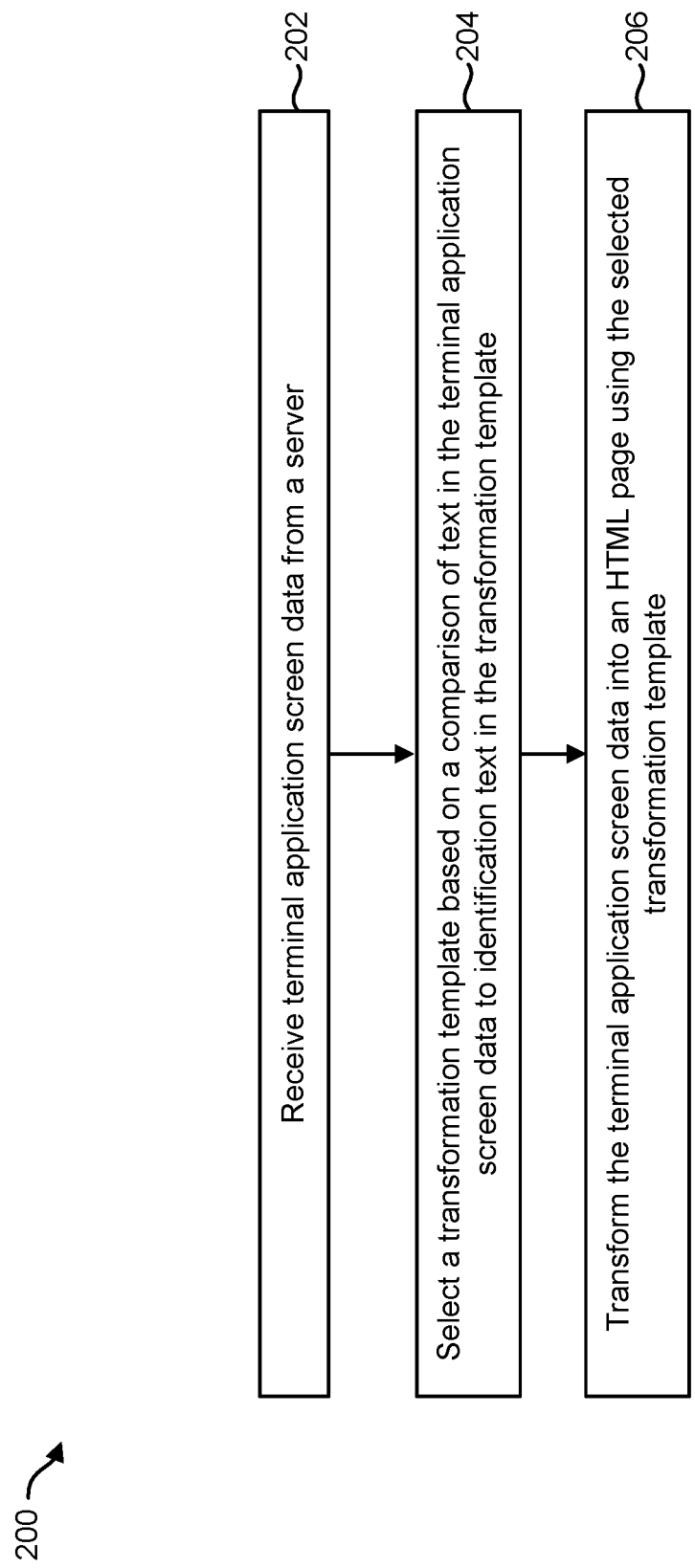
FIG. 2 is a flow diagram illustrating one configuration of a method for presentation of a terminal application screen.

FIG. 2 is a flow diagram illustrating one configuration of a method 200 for presentation of a terminal application screen 109. The method 200 may be implemented by a client device 102. The client device 102 may be in communication with a server 104 via a network 100.

The client device 102 may receive 202 terminal application screen data 112 from the server 104. The terminal application screen data 112 may include a stream of text with which the client device 102 may generate a screen 109 of a terminal application 108. In an implementation, the screen 109 may be entirely text-based. In some circumstances, a user may be given an option to make a selection or enter text-based input. The screen 109 may have fixed-width characters in a matrix of rows and columns.

The client device 102 may select 204 a transformation template 118 based on a comparison of text in the terminal application screen data 112 to identification text 122 in the transformation template 118. The client device 102 may have one or more transformation templates 118 stored in a transformation template archive 116. The one or more transformation templates 118 may correspond to different terminal application screens 109.

The client device 102 may compare text in the terminal application screen data 112 to identification text 122 in the one or more transformation templates 118. The transformation template 118 is selected when the text in the terminal application screen data 112 matches identification text 122 in the transformation template 118.

The client device 102 may transform 206 the terminal application screen data 112 into an HTML page 128 using the selected transformation template 118. The transformation template 118 may include HTML transformation instructions 120 for transforming the terminal application screen data 112 into an HTML page 128. The client device 102 may superimpose dynamic element 115 from the terminal application screen data 112 onto static elements 113 from the selected transformation template 118 to produce the HTML page 128.

Figure 3:
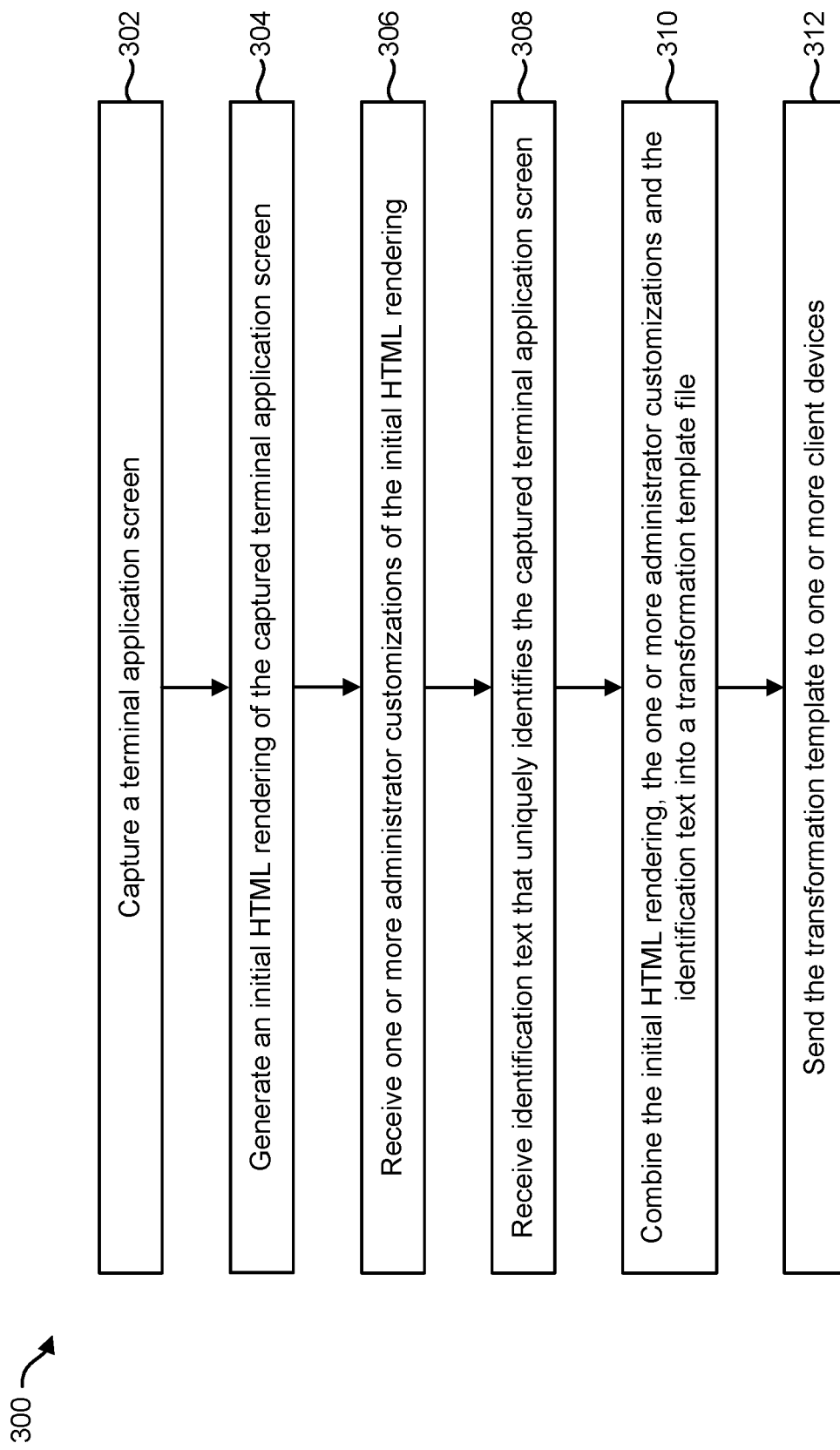
FIG. 3 is a flow diagram illustrating one configuration of a method for generating a transformation template.

FIG. 3 is a flow diagram illustrating one configuration of a method 300 for generating a transformation template 118. The method 300 may be implemented by a computing device 106 that is in communication with a server 104 hosting a terminal application 108.

The computing device 106 may capture 302 a terminal application screen 109. For example, the computing device 106 may initiate a live session with the terminal application 108. The computing device 106 may record terminal application screen data 112. The computing device 106 may record a terminal session including one or more screens 109. The screen 109 may be communicated to the computing device 106 as ASCII characters or other character data.

The computing device 106 may generate 304 an initial HTML rendering of a captured terminal application screen 109. Generating the initial HTML rendering may include converting text from the captured terminal application screen 109 into one or more HTML elements. This initial HTML rendering may be a best guess of how the terminal application screen 109 may be rendered in HTML. For example, the computing device 106 may recognize some combination or pattern of character data in the screen 109 and then translate that into HTML code.

The computing device 106 may receive 306 one or more administrator customizations of the initial HTML rendering. For example, upon generating HTML code for the initial HTML rendering, the computing device 106 may display the initial HTML rendering for the system administrator. The system administrator may provide customizations of the initial HTML rendering for the given screen 109. For example, the system administrator may add to, modify or delete portions of the HTML code that is automatically generated by the computing device 106 in the initial HTML rendering.

The computing device 106 may receive 308 identification text 122 that uniquely identifies the captured terminal application screen 109. The system administrator may specify identification text 122 that is used to uniquely identify the screen 109. The identification text 122 may correspond to text in the captured terminal application screen 109.

The computing device 106 may combine 310 the initial HTML rendering, the one or more administrator customizations and the identification text 122 into a transformation template 118 file. The transformation template 118 may include instructions 120 for transforming the terminal application screen data 112 into an HTML page 128.

The computing device 106 may send 312 the transformation template 118 to one or more client devices 102. For example, the transformation templates 118 may be copied to a client device 102 by the system administrator or deployed to a client device 102 over the network 100.

Figure 4:
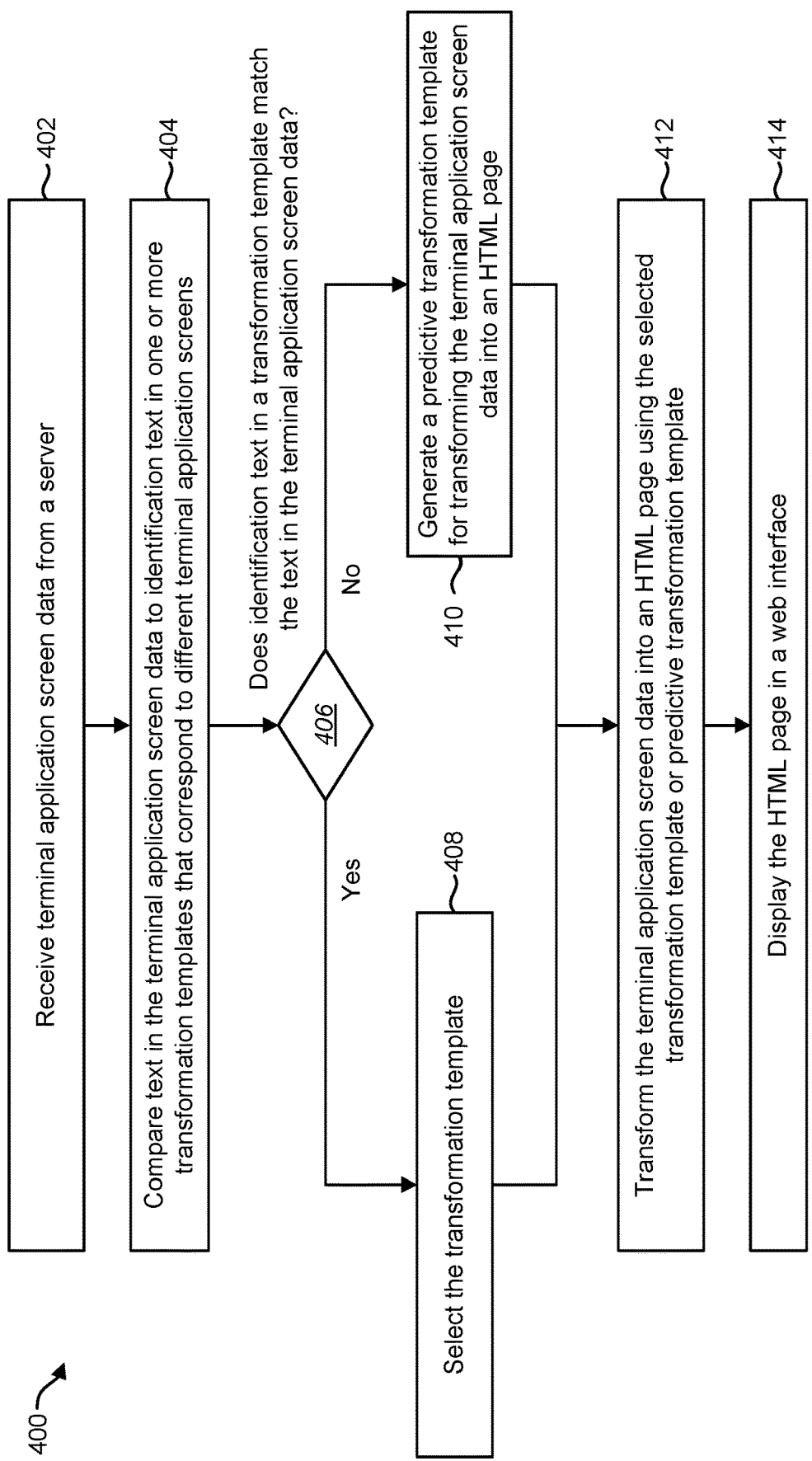
FIG. 4 is a flow diagram illustrating another configuration of a method for presentation of a terminal application screen.

FIG. 4 is a flow diagram illustrating another configuration of a method 400 for presentation of a terminal application screen 109. The method 400 may be implemented by a client device 102. The client device 102 may be in communication with a server 104 via a network 100.

The client device 102 may receive 402 terminal application screen data 112 from the server 104. This may be accomplished as described in connection with FIG. 2.

The client device 102 may compare 404 text in the terminal application screen data 112 to identification text 122 of one or more transformation templates 118. In the case of a plurality of transformation templates 118, each transformation template 118 may have different identification text 122 corresponding to a different terminal application screen 109.

The client device 102 may determine 406 whether identification text 122 in a transformation template 118 matches the text in the terminal application screen data 112. If there is a match, then the client device 102 may select 408 the transformation template 118 with the matching identification text 122.

If the client device 102 does not find identification text 122 that matches the terminal application screen data 112, then the client device 102 may generate 410 a predictive transformation template 119. The predictive transformation template 119 may be an initial HTML rendering of the terminal application screen 109 as an HTML page 128. This predictive transformation template 119 then becomes the selected transformation template.

The client device 102 may transform 412 the terminal application screen data 112 into an HTML page 128 using the selected transformation template 118 or the predictive transformation template 119. This may be accomplished as described in connection with FIG. 2.

The client device 102 may display 414 the HTML page 128 in a web interface on the client device 102. For example, the client device 102 may display the HTML page 128 in a web browser or web view. The client device 102 may receive user input through the web interface. The transformation template 118 may bind the user input to elements 110 defined by the terminal application 108.

Figure 5:
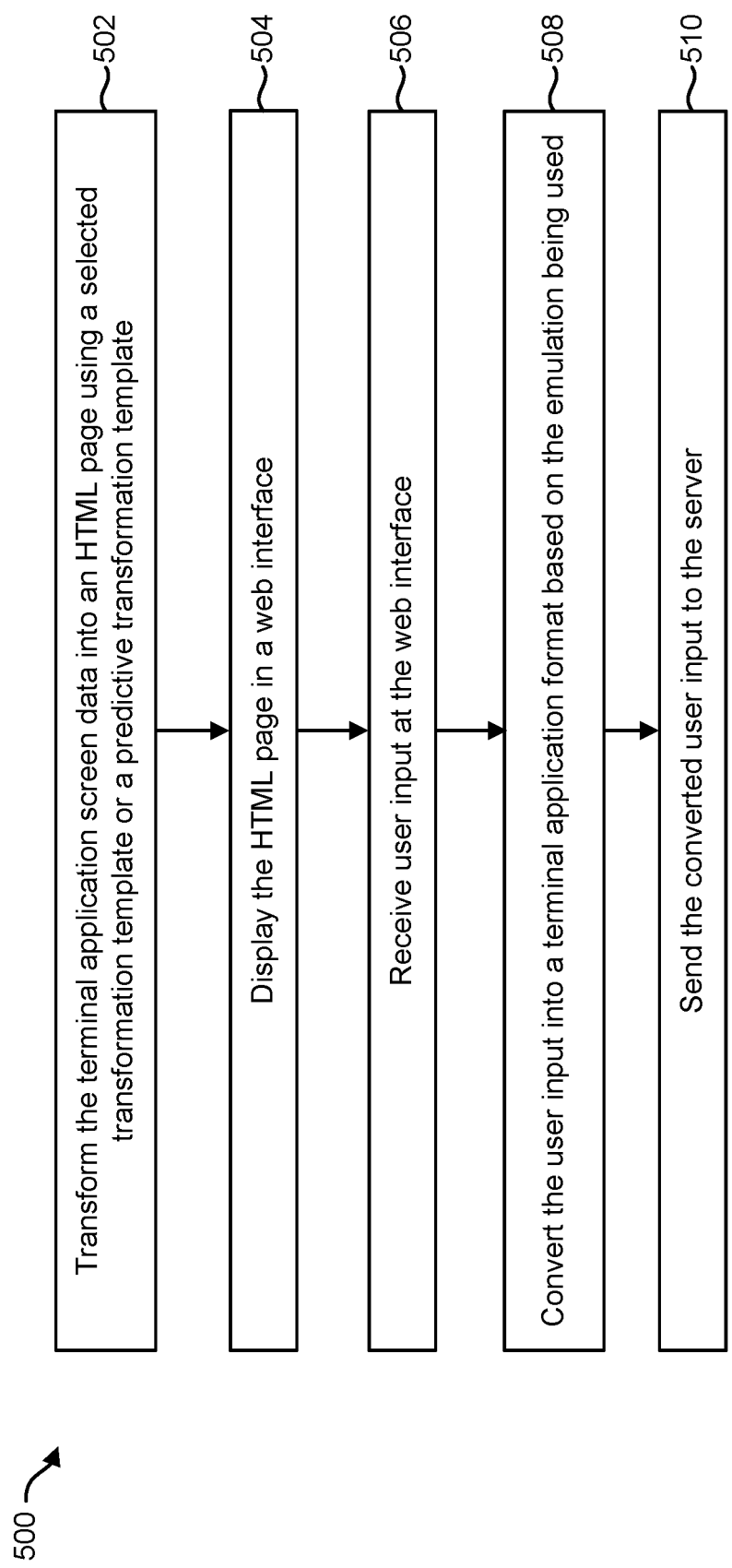
FIG. 5 is a flow diagram illustrating yet another configuration of a method for presentation of a terminal application screen.

FIG. 5 is a flow diagram illustrating yet another configuration of a method 500 for presentation of a terminal application screen 109. The method 500 may be implemented by a client device 102. The client device 102 may be in communication with a server 104 via a network 100.

The client device 102 may transform 502 terminal application screen data 112 into an HTML page 128 using a selected transformation template 118 or a predictive transformation template 119. This may be accomplished as described in connection with FIG. 2.

The client device 102 may display 504 the HTML page 128 in a web interface on the client device 102. This may be accomplished as described in connection with FIG. 2.

The client device 102 may receive 506 user input at the web interface. For example, the web interface may receive input from a keyboard, a scanner (e.g., optical scanner, laser scanner or infrared scanner) or other input device.

The client device 102 may convert 508 the user input into a terminal application format based on the emulation being used. For example, an emulation may be 5250, VT, etc. It should be noted that in this context, the terminal application format is not known by the transformation template 118, but by another part of the terminal emulation program. The transformation template 118 may bind user input to elements 110 defined by the terminal application 108. Therefore, the user input may be converted from an HTML format to a terminal application protocol.

The client device 102 may send 510 the converted user input to the server 104. For example, the client device 102 may send terminal application response data 134 back to the server 104 hosting the terminal application 108. The terminal application 108 may perform an operation using the converted user input.

Figure 6:
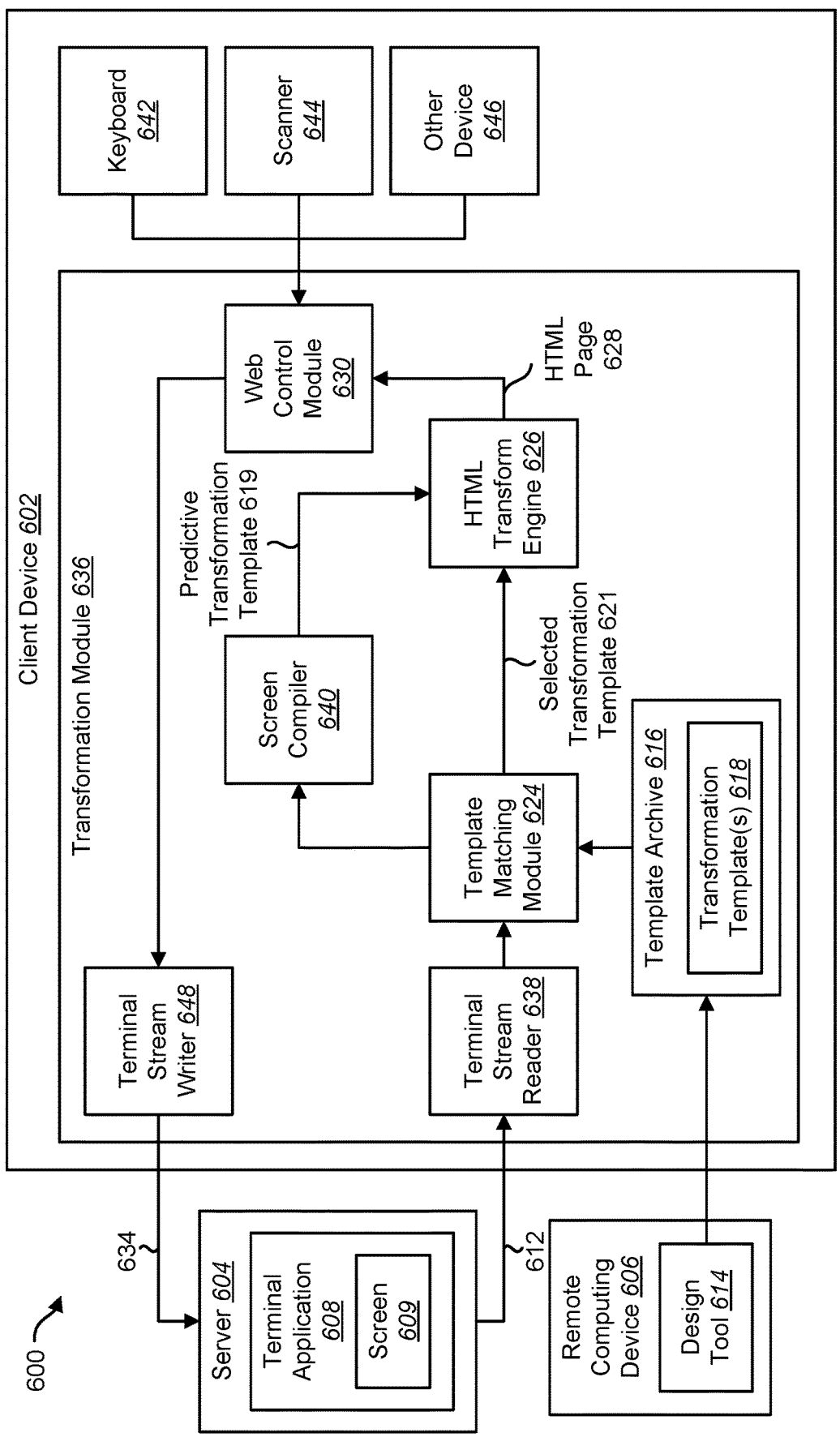
FIG. 6 is a block diagram illustrating another configuration of a network for presentation of a terminal application screen.

FIG. 6 is a block diagram illustrating another configuration of a network 600 for presentation of a terminal application screen 609. The network 600 may include one or more client devices 602, a server 604 and a remote computing device 606.

The remote computing device 606 may include a design tool 614. The design tool 614 may generate one or more transformation templates 618. This may be accomplished as described in connection with FIG. 1. The remote computing device 606 may provide the one or more transformation templates 618 to the client device 602. The client device 602 may store the one or more transformation templates 618 in a template archive 616.

The server 604 may host a terminal application 608. The terminal application 608 may include a text-based screen 609 interface. The server 604 may send terminal application screen data 612 to the client device 602. The screen 609 may be communicated to the client device 602 via terminal control code 111 included in the terminal application screen data 612.

The client device 602 may include a transformation module 636 configured to transform terminal application screen data 612 to an HTML page 628. A terminal stream reader 638 may receive the terminal application screen data 612. The terminal stream reader 638 may convert the terminal control code 111 in the terminal application screen data 612 from the terminal protocol into a format that can be interpreted by a template matching module 624. The output may be a character matrix. This may be referred to as screen data within the code of the application. In essence, the terminal stream reader 638 may output a screen snapshot of characters and their attributes.

The template matching module 624 may compare text in the terminal application screen data 612 to identification text 122 in one or more transformation templates 618. If the template matching module 624 finds identification text 122 that matches the text in the terminal application screen data 612, then the template matching module 624 selects that transformation template 618 and provides that selected transformation template 621 to the HTML transform engine 626.

If the template matching module 624 does not find identification text 122 that matches the text in the terminal application screen data 612, then a screen compiler 640 may generate a predictive transformation template 619 using the terminal application screen data 612 to provide a best guess of an HTML rendering of the terminal application screen 609. The predictive transformation template 619 may be provided to the HTML transform engine 626.

Upon receiving the selected transformation template 621 or the predictive transformation template 619, the HTML transform engine 626 may transform the terminal application screen data 612 into an HTML page 628. The transformation template (i.e., the selected transformation template 621 or the predictive transformation template 619) may include instructions 120 for transforming the terminal application screen data 612 into an HTML page 628. The HTML transform engine 626 may superimpose dynamic element 115 from the terminal application screen data 612 onto static elements 113 from the selected transformation template 621 or the predictive transformation template 619 to produce the HTML page 628. The HTML transform engine 626 may provide the HTML page 628 to a web control module 630.

The web control module 630 may display the HTML page 628 in a web interface. For example, the web control module 630 may display the HTML page 628 in a web browser or web view.

The web control module 630 may receive input from one or more input devices. In an implementation, the web control module 630 may receive input from a keyboard 642, a scanner 644 or any other device 646. The transformation template 618 and predictive transformation template 619 bind user input to elements 110 defined by the terminal application 608.

The web control module 630 may provide the input to a terminal stream writer 648. The terminal stream writer 648 may convert the output of the web control module 630 into the terminal protocol used by the terminal application 608. The terminal stream writer 648 may send terminal application response data 634 back to the server 604.

Figure 7:
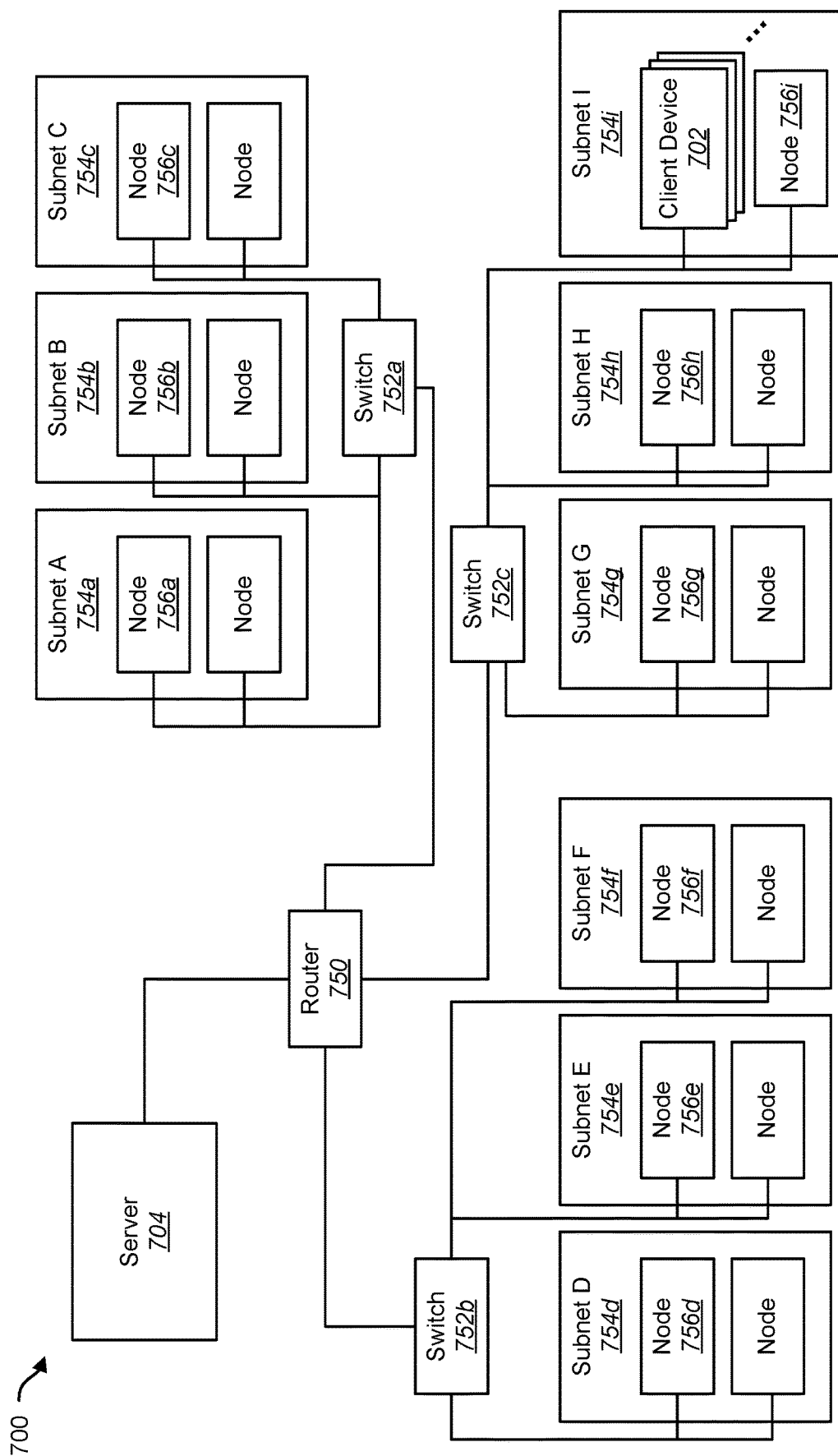
FIG. 7 is a block diagram that illustrates one configuration of a network where systems and methods for presentation of a terminal application screen may be implemented.

FIG. 7 is a block diagram that illustrates one configuration of a network 700 where systems and methods for presentation of a terminal application screen 109 may be implemented. A server 704 is connected to a router 750. The router 750 is connected to switches 752a, 752b, and 752c. The switch 752a is connected to several nodes 756a, 756b, 756c, etc., via their respective subnets 754a, 754b, and 754c. The switch 752b is connected to several nodes 756d, 756e, 756f, etc., via their respective subnets 754d, 754e, and 754f. The switch 752c is connected to several nodes 756g, 756h, and 756i, etc., via their respective subnets 754g, 754h and 754i. Subnet I 754i includes one or more client devices 702.

Although FIG. 7 only shows one router 750, and a limited number of switches 752, subnets 754 and nodes 756, many and varied numbers of routers 750, switches 752, subnets 754 and nodes 756 may be included in networks and/or systems that may implement systems and methods for presentation of a terminal application screen 109.

It should be noted that the server 704 may be implemented in accordance with the server 104 described in connection with FIG. 1. Furthermore, the client devices 702 may be examples of one or more of the client devices 102 described in connection with FIG. 1.

Figure 8:
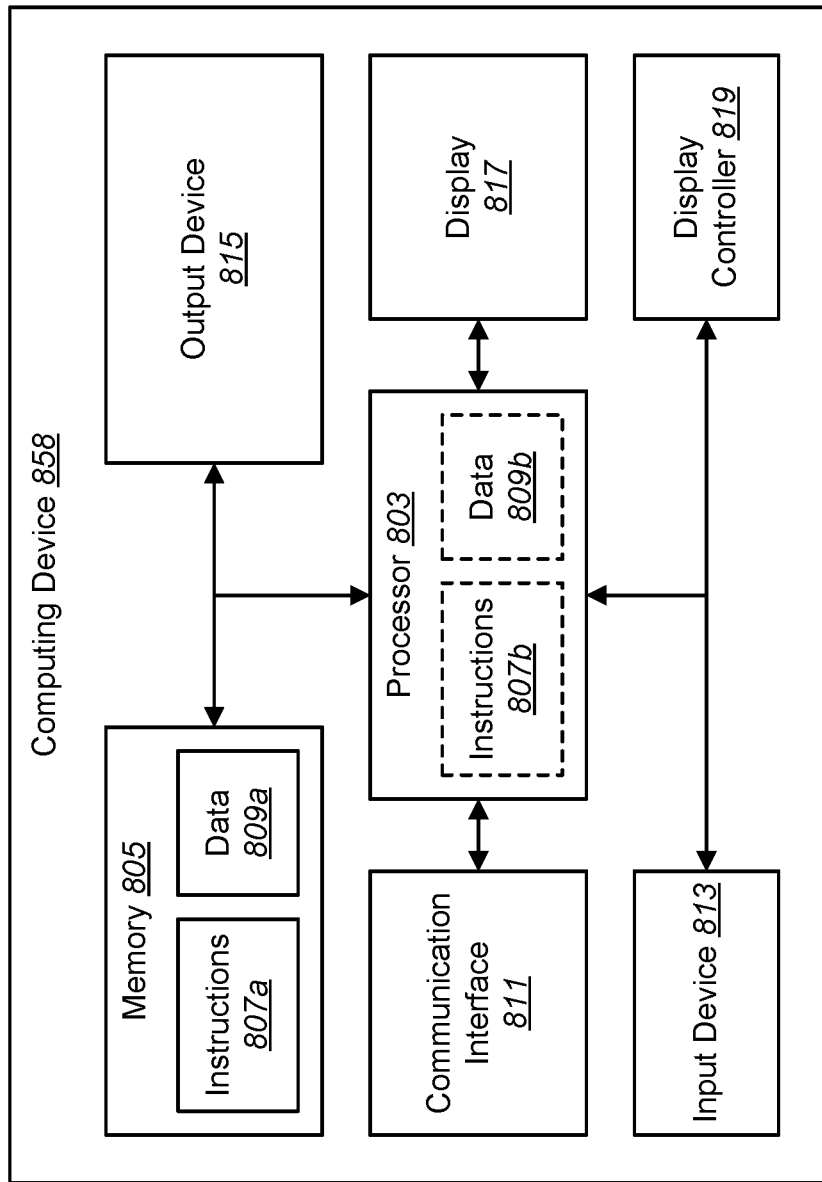
FIG. 8 illustrates various components that may be utilized in a computing device.

FIG. 8 illustrates various components that may be utilized in a computing device 858. The computing device 858 may be configured in accordance with one or more of the client devices 102, 602, the servers 104, 604 and the remote computing devices 106, 606 described herein.

The computing device 858 may include a processor 803 and memory 805. The memory 805 may include instructions 807a and data 809a. The processor 803 controls the operation of the computing device 858 and may be, for example, a microprocessor, a microcontroller, a digital signal processor (DSP) or other device known in the art. The processor 803 typically performs logical and arithmetic operations based on program instructions 807b and/or data 809b received from the memory 805.

The computing device 858 typically may include one or more communication interfaces 811 for communicating with other electronic devices. The communication interfaces 811 may be based on wired communication technology, wireless communication technology or both. Examples of different types of communication interfaces 811 include a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The computing device 858 typically may include one or more input devices 813 and one or more output devices 815. Examples of different kinds of input devices 813 include a keyboard, mouse, microphone, remote control device, button, joystick, trackball, touchpad, lightpen, etc. Examples of different kinds of output devices 815 include a speaker, printer, etc. One specific type of output device that may be included in a computer system is a display device 817. Display devices 817 used with configurations disclosed herein may utilize any suitable image projection technology, such as liquid crystal display (LCD), light-emitting diode (LED), gas plasma, electroluminescence, a cathode ray tube (CRT) or the like.

A display controller 819 may also be provided, for converting data stored in the memory 805 into text, graphics and/or moving images (as appropriate) shown on the display device 817. Of course, FIG. 8 illustrates only one possible configuration of a computing device 858. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for automatic presentation of a terminal application screen, comprising:
   receiving, at a client device, terminal application screen data from a server, the terminal application screen data including a stream of text defining elements of a screen of a terminal application that is hosted at the server;
   selecting, at the client device and based on the terminal application screen data and identification text associated with transformation template data, a transformation template from a plurality of transformation templates stored in a transformation template archive on the client device,
   transforming, on-the-fly and using instructions of the selected transformation template, the screen of the terminal application related to the terminal application screen data to a Hyper Text Markup Language (HTML) page that is suitable for presentation in a web browser;
   displaying the HTML page in a web interface on the client device;
   receiving, at the client device, user input from a scanner, the user input being configured for entry into at least a portion of the HTML page displayed on the web interface;
   binding, using the selected transformation template, the user input with the elements defined by the terminal application;
   converting, using the selected transformation template, the user input to terminal application response data that is formatted according to a terminal application protocol; and
   sending, after the converting, the terminal application response data to the server for inclusion in the terminal application.

2. The method of claim 1, wherein the elements defined by the stream of text in the terminal application screen data include dynamic elements, and the transforming comprises: superimposing the dynamic elements defined by the terminal application screen data onto static elements defined by the selected transformation template to produce the HTML page.

3. The method of claim 1, wherein the selecting the transformation template is in response to determining that a portion of the stream of text in the terminal application screen data matches the identification text associated with the selected transformation template.

4. The method of claim 1, wherein the terminal application screen data is first terminal application screen data and the HTML page is a first HTML page, the method further comprising:
   receiving, at the client device, second terminal application screen data from the server, the second terminal application screen data including a stream of text associated with a second terminal application screen; and
   in response to determining that a portion of the stream of text in the second terminal application screen data does not match identification text associated with any transformation template from the plurality of transformation templates:
   generating a predictive transformation template for transforming the second terminal application screen data into a second HTML page; and
   generating the second HTML page using the predictive transformation template and the second terminal application screen data.

5. The method of claim 1, wherein each transformation template from the plurality of transformation templates is associated with a different terminal application screen.

6. The method of claim 1, wherein the transforming the HTML page includes converting the stream of text defining elements of the terminal application screen into one or more HTML elements.

7. The method of claim 1, wherein the stream of text includes text captured from the terminal application screen, the terminal application screen being a text-based terminal application screen.

8. The method of claim 1, further comprising:
   determining a type of the terminal application screen based on the terminal application screen data,
   the selecting being based on the type of the terminal application screen.

9. A client device configured for automatic presentation of a terminal application screen, comprising:
   a processor;
   memory in electronic communication with the processor;
   a display; and
   instructions stored in the memory, the instructions being executable to:
      receive terminal application screen data from a server, the terminal application screen data including a stream of text defining elements of a screen of a terminal application that is hosted at a server;
      compare a portion of the stream of text with identification text associated with transformation template data of each transformation template from a plurality of transformation templates stored in a transformation template archive in the memory;
      select a transformation template from the plurality of transformation templates based on the comparison;
      transform, on-the-fly and using instructions of the selected transformation template, the screen of the terminal application related to the terminal application screen data to a Hyper Text Markup Language (HTML) page that is suitable for presentation in a web browser;
      display the HTML page in a web interface on the display;
      receive user input from a scanner, the user input being configured for entry into at least a portion of the HTML page displayed on the web interface;
      bind, using the selected transformation template, the user input with the elements defined by the terminal application;
      convert, using the selected transformation template, the user input to terminal application response data that is formatted according to a terminal application protocol; and
      send the terminal application response data to the server for inclusion in the terminal application.

10. The client device of claim 9, wherein the elements defined by the terminal application screen data include dynamic elements, and the instructions executable to transform comprise instructions executable to:

superimpose the dynamic elements defined by the terminal application screen data onto static elements defined by the selected transformation template to produce the HTML page.

11. The client device of claim 9, wherein the instructions executable to select the transformation template include instructions executable to:
select the transformation template in response to determining that a portion of the stream of text in the terminal application screen data matches identification text associated with the selected transformation template based on the comparison.

12. The client device of claim 9, wherein the terminal application screen data is first terminal application screen data and the HTML page is a first HTML page, the instructions further executable to:
receive, at the client device, second terminal application screen data from the server, the second terminal application screen data including a stream of text associated with a second terminal application screen; and
in response to determining that a portion of the stream of text in the second terminal application screen data does not match the identification text associated with each transformation template from the plurality of transformation templates:
generate a predictive transformation template for transforming the second terminal application screen data into a second HTML page; and
generate the second HTML page using the predictive transformation template and the second terminal application screen data.

13. The client device of claim 9, wherein each transformation template from the plurality of transformation templates is associated with a different terminal application screen.

14. The client device of claim 9, wherein the instructions executable to transform the HTML page include instructions executable to convert the stream of text defining elements of the terminal application screen into one or more HTML elements.

15. The client device of claim 9, wherein the stream of text includes text captured from the terminal application screen, the terminal application screen being a text-based terminal application screen.

16. The client device of claim 9, wherein the instructions are further executable to:
determine a type of the terminal application screen based on the comparison, and
the instructions executable to select the transformation template include instructions executable to select the transformation template based on the type of the terminal application screen.

17. One or more non-transitory computer-readable media storing one or more programs that are configured, in response to execution by one or more processors to cause a system to execute or control execution of operations comprising:
receiving terminal application screen data from a server, the terminal application screen data including a stream of text defining elements of a screen of a terminal application that is hosted at the server;
selecting, at a client device and based on the terminal application screen data and identification text associated with transformation template data, a transformation template from a plurality of transformation templates stored in a transformation template archive on the client device;
transforming, on-the-fly and using instructions of the selected transformation template, the screen of the terminal application related to the terminal application screen data to a Hyper Text Markup Language (HTML) page that is suitable for presentation in a web browser;
displaying the HTML page in a web interface on the client device;
receiving, at the client device, user input from a scanner, the user input being configured for entry into at least a portion of the HTML page displayed on the web interface;
binding, using the selected transformation template, the user input with the elements defined by the terminal application;
converting, using the selected transformation template, the user input to terminal application response data that is formatted according to a terminal application protocol; and
sending, after the converting, the terminal application response data to the server for inclusion in the terminal application.

18. The one or more non-transitory computer-readable media of claim 17, wherein:
the elements defined by the stream of text in the terminal application screen data include dynamic elements; and
the transforming includes superimposing the dynamic elements defined by the terminal application screen data onto static elements defined by the selected transformation template to produce the HTML page.

19. The one or more non-transitory computer-readable media claim 17, wherein the selecting the transformation template is in response to determining that a portion of the stream of text in the terminal application screen data matches the identification text associated with the selected transformation template.

20. The one or more non-transitory computer-readable media claim 17, wherein:
the terminal application screen data is first terminal application screen data and the HTML page is a first HTML page; and
the operations further comprise:
receiving, at the client device, second terminal application screen data from the server, the second terminal application screen data including a stream of text associated with a second terminal application screen; and
in response to determining that a portion of the stream of text in the second terminal application screen data does not match identification text associated with any transformation template from the plurality of transformation templates:
generating a predictive transformation template for transforming the second terminal application screen data into a second HTML page; and
generating the second HTML page using the predictive transformation template and the second terminal application screen data.

* * * * *